(12) United States Patent
Funck et al.

(10) Patent No.: US 11,959,511 B2
(45) Date of Patent: Apr. 16, 2024

(54) ROD END WITH LOCKING DEVICE FOR STRUTS

(71) Applicant: Albany Engineered Composites, Inc., Rochester, NH (US)

(72) Inventors: Ralph Funck, Kaiserslautern (DE); Martin Welsch, Henschtal (DE); Alexander Wieland, Rodalben (DE)

(73) Assignee: Albany Engineered Composites, Inc., Rochester, NH (US)

( * ) Notice: Subject to any disclaimer, the term of this patent is extended or adjusted under 35 U.S.C. 154(b) by 57 days.

(21) Appl. No.: 17/225,353

(22) Filed: Apr. 8, 2021

(65) Prior Publication Data

US 2021/0317855 A1 Oct. 14, 2021

Related U.S. Application Data (60) Provisional application No. 63/007,739, filed on Apr. 9, 2020.

(51) Int. Cl.
*F16B 7/06* (2006.01)
*F16B 7/04* (2006.01)

(52) U.S. Cl.
CPC .................... *F16B 7/042* (2013.01)

(58) Field of Classification Search
CPC .... F16B 7/06; F16B 7/04; F16B 7/042; F16B 7/18; F16B 7/182; F16C 7/06; Y10T 403/291; Y10T 403/295
See application file for complete search history.

(56) References Cited

U.S. PATENT DOCUMENTS

| | | | |
|---|---|---|---|
| 2,278,320 A | 3/1942 | Kath | |
| 3,736,010 A | 5/1973 | Larkin | |
| 8,622,671 B2 * | 1/2014 | Gagneur | F16B 39/24 403/315 |
| 2012/0224913 A1 * | 9/2012 | Haller | F16C 7/06 403/46 |

FOREIGN PATENT DOCUMENTS

| | | |
|---|---|---|
| DE | 20 2012 103 224 U1 | 11/2012 |
| DE | 20 2015 103 632 U1 | 9/2015 |
| EP | 1 805 427 B1 | 9/2010 |
| EP | 2 703 661 A2 | 3/2014 |

(Continued)

OTHER PUBLICATIONS

International Search Report and Written Opinion prepared for corresponding international application PCT/US2021/026333 by the European Patent Office, acting as the International Searching Authority, dated Jul. 1, 2021.

(Continued)

*Primary Examiner* — Daniel J Wiley
(74) *Attorney, Agent, or Firm* — McCarter & English, LLP (57) ABSTRACT

The present invention concerns a rod end that has a locking mechanism where the locking mechanism has an insert, a fork end, a female torque locking element, and a male torque locking element. Upon activation of the locking mechanism, the female torque locking element engages with the male torque locking element in a form-fitting connection. The locking mechanism of the present invention can easily be activated and is capable of withstanding a torque.

17 Claims, 10 Drawing Sheets

(56) References Cited

FOREIGN PATENT DOCUMENTS

WO     WO 2011/057627 A1     5/2011
WO     WO 2012/100794 A1     8/2012

OTHER PUBLICATIONS

Merriam-Webster: "Turnbuckle Definition and Meaning," accessed Feb. 17, 2023, see https://www.merriam-webster.com/dictionary/turnbuckle, 10 pages.
The Free Dictionary: "Turnbuckle—definition of turnbuckle by The Free Dictionary," accessed Feb. 17, 2023, see https://www.thefreedictionary.com/turnbuckle, 2 pages.

\* cited by examiner

ROD END WITH LOCKING DEVICE FOR STRUTS

CROSS-REFERENCE TO RELATED APPLICATION

This application claims the benefit of priority of U.S. Provisional Patent Application Ser. No. 63/007,739 filed Apr. 9, 2020. The foregoing application is incorporated herein by reference in its entirety.

FIELD OF THE INVENTION

The present invention relates to a rod end with a locking device for a tie rod or strut.

BACKGROUND

Rod ends are devices often used in the aerospace industry. A rod end is a mechanical articulating joint and such joints are used on the ends of struts or tie rods.

However, rod ends in the art have many drawbacks.

For example, EP 1 805 427 B1, relates to a draw-pull bar for guidance and mechanical bearing in machinery and aircraft. Here, the draw-pull bar has a body and at least one adapter that is fitted to the draw-pull bar. The adapter is connected to the body by means of a threaded arrangement for a length variation of the draw-pull bar. In such a way, the draw-pull bar can be turned relative to the body as well as with a detent mechanism connected with the adapter by means of a bolt and a connecting element. As such, there can be rotary movement to such an extent that it can be locked and unlocked again in a multitude of rotary positions by means of a pre-determinable locking force. The detent mechanism consists of two locking elements where the first locking element is fitted to the adapter and the second locking element is attached to the body.

Among other things, this disclosure has the disadvantage of a cost-intensive production of the locking clip. Moreover, for the transmission of higher torques an additional securing clip would be required and is difficult to install when assembling the rod in the aircraft is required. This is shown in Patent Application WO 2012/100794A1.

In another reference, WO 2011/057627, a push/pull rod has a fastening device, a connecting piece having end faces distanced from each other in the axial direction, and a locking device with first and second locking elements. The two locking elements face each other when viewed in the axial direction and are pressed against each other by means of a spring element. The spring element is supported at the first end on a support shoulder formed on the connecting piece and at the second end on the second locking element. The rotational motion of the fastening device relative to the connecting piece is releasably blocked at a predetermined locking force by the locking elements in a plurality of rotational positions.

One of the disadvantages of the push/pull rod of WO 2011/057627 is that during assembly it is necessary to overcome the torque of the locking device when screwing it in which results in insufficient usability.

DE 20 2012 103 224 U1 discloses a tension-compression rod with a hollow cylindrical central body with a fastening device with a coupling element and a shank arranged thereon. With at least one connecting piece, the fastening device is rotatably connected to the connecting piece via a thread arrangement in order to change the length of the tension-compression rod. At least one of the thread arrangements has a helically wound steel wire insert arranged between the connecting piece and the shaft.

One of the disadvantages of this tension-compression rod is that during assembly, it is necessary to overcome the torque of the locking device when screwing it in, resulting in insufficient usability.

In EP 2 703 661 A2, the rod has fastening devices arranged in a hollow cylindrical central body. The fastening devices are pivotally connected to connecting pieces through screw-threaded arrangements for changing length of the rod. The arrangements comprise helically wound steel wire inserts, which are arranged among the connecting pieces and shafts of the fastening devices. The connecting pieces are formed as sleeve-shaped components. External threads formed at the shafts correspond to the internal threads of the connecting pieces.

One of the disadvantages with the rod of EP 2 703 661 A2 is that it is necessary to overcome the torque of the locking device when screwing in, resulting in insufficient usability.

In DE 20 2015 103 632 U1, the tension-compression rod has a fastening device with a coupling element and a shank arranged thereon. There is at least one sleeve-shaped connecting piece, the fastening device being rotatably connected to the connecting piece via a thread arrangement in order to vary the length of the tension-compression rod. The latching device has a first and second latching elements which, when viewed in the radial direction face one another and interact. The two elements releasably arrest the rotational movement of the fastening device relative to the connecting piece in a plurality of rotational positions with a predetermined locking force. The first detent element is formed on an inner circumferential surface of a ring element, where the ring element is displaceable in the axial direction and is connected to the connecting piece in a rotationally fixed manner in the circumferential direction. The second detent element is arranged in a rotationally fixed manner on the shaft of the fastening device.

A disadvantage here is that during assembly it is necessary to overcome the torque of the locking device when screwing in the rod, thus resulting in insufficient usability.

SUMMARY OF THE INVENTION

The present invention concerns a rod end comprising a locking mechanism. The locking mechanism comprises an insert, a fork end, a female torque locking element, and a male torque locking element, wherein upon activation of the locking mechanism, the female torque locking element engages with the male torque locking element in a form-fitting connection.

In certain embodiments, the rod end has a female torque element situated inside the insert.

In certain embodiments, the insert comprises at least one groove and the female torque locking element comprises at least one key that fits into the insert groove.

In certain embodiments, the rod end further comprises a spring.

In certain embodiments, the rod end has a female torque locking element situated in the insert at a position where the female torque locking element is not engaged with the male torque locking element, and may be situated at or near the base of the insert. In some embodiments, a spring is situated below the female torque locking element such that upon adjusting the female torque locking element into a free position, the female torque locking element is moved by the spring such that the female torque locking element engages the male torque locking element in a form-fitting connection.

In certain embodiments, the insert has a snap-in groove that holds the female torque locking element at a position where the female torque locking element is not engaged with the male torque locking element until the locking mechanism is activated.

In certain embodiments, the female torque locking element further comprises a female radial sprocket.

In certain embodiments, the male torque locking element further comprises one or more keys and a male radial sprocket.

In certain embodiments, upon activation of the locking mechanism, the male sprocket engages the female sprocket in a form-fitting connection between the female torque locking element and the male torque locking element.

In certain embodiments, the rod end has a locking clip and a latch.

In certain other embodiments, the rod end has a release clip comprising one or more keys. In certain embodiments, the release clip is made of plastic.

In certain embodiments, the insert has a groove and the female torque locking element has a groove. In further embodiments, one or more keys of a release clip can fit into the grooves of the insert and female torque locking element such that the locking mechanism is inactive.

In certain embodiments, the locking mechanism is activated by pulling the release clip such that the female torque locking element is pushed upward by a spring such that the female torque locking element engages the male torque locking element in a form-fitting connection.

In certain embodiments, the locking mechanism is external to the rod end.

In certain other embodiments, the rod end has a radial sprocket.

In certain other embodiments, there is no substantial torque for length adjustment of the rod end that is required.

BRIEF DESCRIPTION OF THE DRAWINGS

FIG. 1 illustrates an insert (2) having a fork end (5) and a female torque element (3) and a male torque element (4). FIG. 1 further illustrates a locking clip (7) and latch (8).

FIG. 2A shows the rod end (1) where the locking mechanism is not active.

FIG. 2B shows where the locking mechanism is active because the female torque locking element (3) has been pushed upward by the spring (15) and the female torque locking element (3) snaps into the male torque locking element (4).

DETAILED DESCRIPTION OF THE INVENTION

The terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

The term "bush," "bushes," and "bushing" are used interchangeably herein and would be appreciated as having their ordinary and customary meaning to a person of ordinary skill in the art. For example, the term(s) would include a mechanical fixing between at least two, possibly moving, parts, or a strengthened fixing point where one mechanical assembly is attached to another. Additionally, the term(s) can include, e.g., a lining, such as a metal lining, for a hole, especially one in which an axle revolves.

The present invention solves problems in the art by, among other things, providing a rod end for struts that can be used for aerospace applications, where the rod end has an integrated locking mechanism. The locking mechanism of the present invention can easily be activated and is capable of withstanding a torque.

The present invention offers advantages and solutions over the afore-mentioned art. Examples of such advantages include the following: (i) a safe locking mechanism, (ii) the length of the rod end can be adjusted without applying additional torque for mounting (most of the art involves a need to overcome a certain torque of the locking device when screwing in), (iii) the locking mechanism can be easily activated with one hand, which results in extremely good usability, (iv) most of the parts can be produced by injection molding and is thus cost effective, and (v) with a rod having a radial sprocket, a spring force is no longer responsible for the amount of transmittable torque after activation of the locking mechanism, which results in greater usability.

Rod ends of the present invention are often used preferably, but not exclusively, in aerospace. For example, rod ends can be used in aircraft and spacecraft, such as airplanes, rotary-wing aircraft, airships, unmanned aviation systems, rockets, and satellites.

The present invention concerns a rod end with a locking device that can be used for any tie rod or strut, or member similar to a tie rod or strut. In some embodiments, a locking device of the present invention can be activated with one hand, which is helpful for mounting. In further embodiments, a locking device of the present invention can withstand a torque, and thus prevent an undesired change in rod end length. Torque would be understood through its customary meaning, e.g., as a turning or twisting force. During the assembly of a rod in accordance with the present invention, the length of the rod end can be adjusted via a fork end as long as the locking device is not activated.

Additionally, in certain embodiments, a rod end of the present invention has a torque locking mechanism, which is activated by a locking element. For example, in one embodiment, the locking element is pushed in an axial direction by a spring. Locking elements of the present invention can be comprised of a female torque locking element and a male torque locking element. Parts of the locking mechanism, for example, a female torque locking element, can be manufactured by, e.g., injection molding.

In certain embodiments, no significant or substantial torque (except, in particular embodiments, friction torque caused by thread friction) for length adjustment of the rod end is required.

In certain embodiments, a rod end of the present invention can be equipped with an integrated locking mechanism that can be activated on the outside, that is, external to the rod end, without use of any further part or member. Accordingly, the locking mechanism can be formed with other components of the rod end as a single unit. Thus, in some embodiments, the locking mechanism comprises part of the rod end.

Generally, the locking mechanism relates to the interrelationship between and may include, e.g., female and male torque locking elements, a locking clip, a latch, a spring, grooves, keys, and/or a release clip of a rod end of the present invention, such that the female torque locking element can be fitted with the male torque locking element to lock the fork end at its desired adjusted length.

In some embodiments, a rod end of the present invention comprises an insert, female and male torque locking elements, a fork end with bushes and a retaining washer, and a locking clip with a latch and a bolt.

In certain embodiments, the present invention includes a rod end with a radial sprocket where spring force from, e.g., a spring, is no longer responsible for the amount of transmittable torque after activation of the locking mechanism.

In some embodiments, an insert can be comprised of metal, short fiber reinforced plastic with thermoplastic matrix and glass or carbon fiber, or any kind of plastic material, or combinations thereof. In certain embodiments, a female and/or male torque locking element can be comprised of metal, short fiber reinforced plastic with thermoplastic matrix and glass or carbon fiber, or any kind of plastic material, or combinations thereof. In other embodiments, a fork end can be comprised of metal, short or long fiber reinforced plastic with thermoplastic or thermoset matrix and any kind of fiber (e.g., carbon, glass, aramid, or ceramic), or combinations thereof.

The invention is further explained in detail below on the basis of exemplary embodiments.

Figure 1:
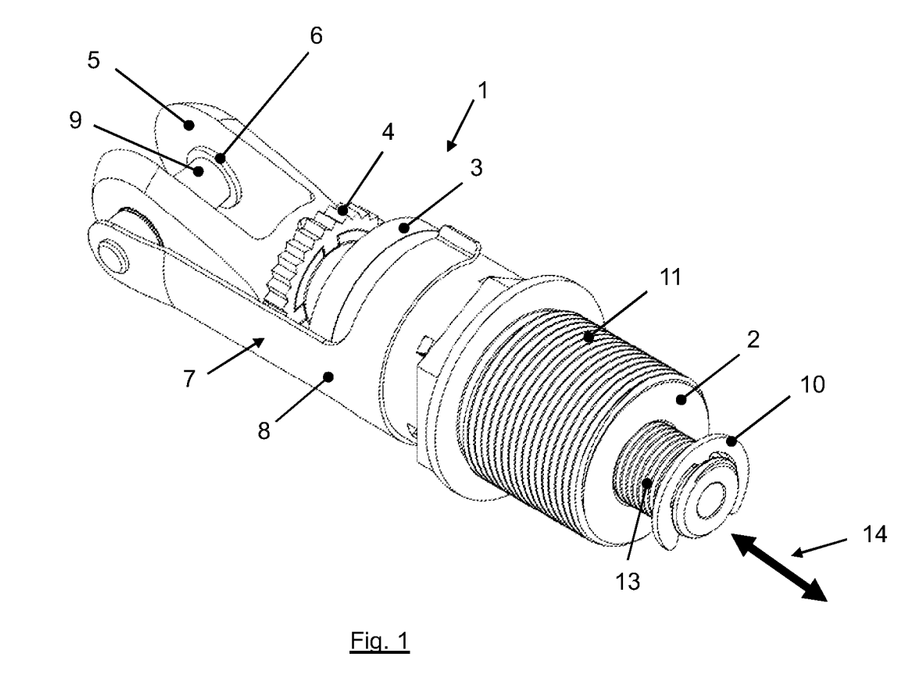
FIG. 1 illustrates a rod end with a locking device for a tie rod or strut.

In the embodiment presented in FIG. 1, the rod end (1) of the present invention is shown having an insert (2). The insert (2) has an interior space formed by an opening that is circular in shape. The female torque locking element (3) at least partially extends into and fits within the interior space of insert (2). A male torque locking element (4) is also shown in FIG. 1. The male torque locking element (4) is adjacent to the female torque locking element (3) on the opposite side of the female torque locking element than that portion of the female torque locking element (3) that extends into the insert (2). The male torque locking element does not extend into the interior space of the insert (2).

A locking clip (7) is disposed around the insert (2). The locking clip (7) has a latch (8).

The locking clip (7) forms a circular or cylindrical shape around the female and male torque locking elements (3), (4). The latch (8) of the locking clip (7) at least partially encircles, such as an arc shape, the female torque locking element (3).

When the locking mechanism is activated, the female torque locking element (3) and the male torque locking element (4) engage with each other and thereby secure or lock the fork end (5) and insert (2). The female torque locking element (3) and male torque locking element (4) are operably engaged externally.

Further in FIG. 1, at one end of the rod end (1) is a fork end (5) with a bushing (6). In certain embodiments, a purpose of the bushing (6) is to allow parts to have a tight tolerance for a bolt. A bushing (6) can be part of the fork end and does not need to be secured as it can be pressed inside. A bolt (9) passes through the bushing (6) and the fork end (5). The bolt (9) can further pass through a locking clip (7). The bolt (9) further secures the fork end (5), bushing (6), and locking clip (7) together. At the other end of the rod end (1) is a retaining washer (10) that at least partially encircles an external thread (13) of the fork end (5). The external thread (13) of the fork end can at least partially extend into the insert (2). Typically, the fork end thread length should have at least the same thread length as the insert (2). But, in general, the fork end thread length is often longer because one can change the eye-to-eye length, e.g., the total length as measured from the center of a mounting bolt hole, of a tie rod or strut further to the present invention. There is also an external thread (11) that envelops the insert (2). The external thread (11) can be the same length as the insert (2) or shorter than the insert (2). The length (14) of the rod end can be adjusted.

Figure 2A:
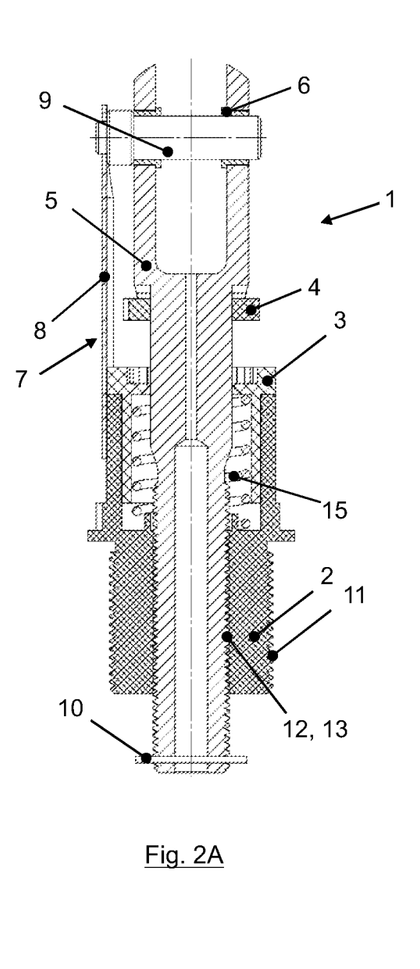
FIG. 2A illustrates a side view cross-sectional profile of a rod end with a locking device for a tie rod or strut.
Figure 2B:
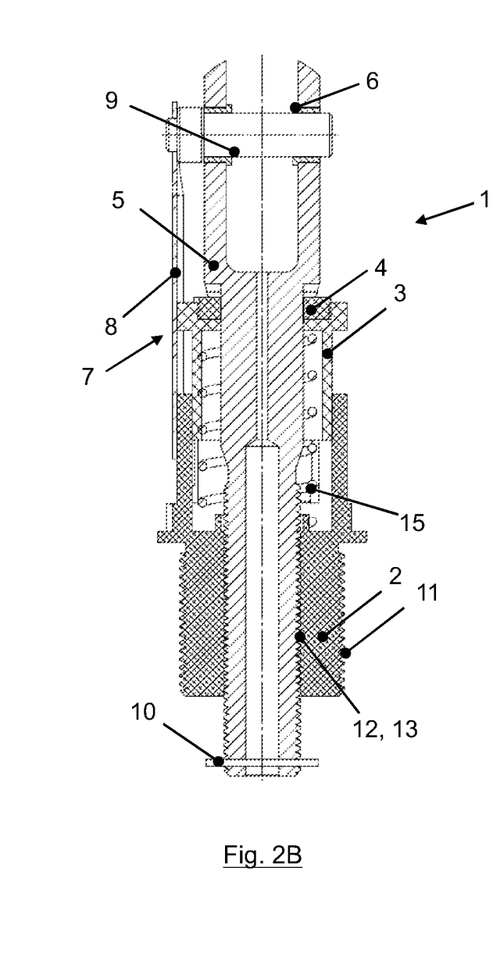
FIG. 2B illustrates a side view cross-sectional profile of a rod end with a locking device for a tie rod or strut.

FIGS. 2A and 2B show a further embodiment of the rod end with locking mechanism of the present invention.

FIG. 2A shows an embodiment of the rod end (1) where the locking mechanism is not active. More particularly, FIG. 2A shows a female torque locking element (3) at an inactive position inside an insert (2). Inside the insert (2) and below the female torque locking element (3) is a spring (15). At this position in FIG. 2A, the spring (15) is pre-stressed.

After the required length of the fork end (5) has been determined and set, the locking clip (7) may be assembled. For example, in certain embodiments, the locking clip has a bolt (9) that is put through one or more bushings (6). After length adjustment of the fork end (5), the locking clip (7) is then assembled by pushing the clip (7) over the insert (2) and the bolt (9) through bushings (6).

The female torque locking element can be rotated externally by use of, e.g., a single hand of a person. By twisting or rotating the female torque locking element (3) into its free position, that is, by rotating the female torque locking element, it may be unlocked and can move in grooves (17) of the insert (2) (see FIG. 3). The locking mechanism is thus activated, and the female torque locking element (3) is pushed upwards by the spring (15) and snaps into the male torque locking element (4) as depicted in FIG. 2B.

A person of ordinary skill would appreciate that alternatively to the spring (15), other mechanisms such as a coil, rubber spring, or any other mechanism that acts like a spring could be used.

FIG. 2B shows the rod end (1) of FIG. 2A where the locking mechanism has been activated. In FIG. 2B, the spring (15) could still be pre-stressed, but the pre-stress is lower than in FIG. 2A. In FIG. 2B, the female torque locking element (3) is depicted engaged with the male torque locking element (4).

Figure 3:
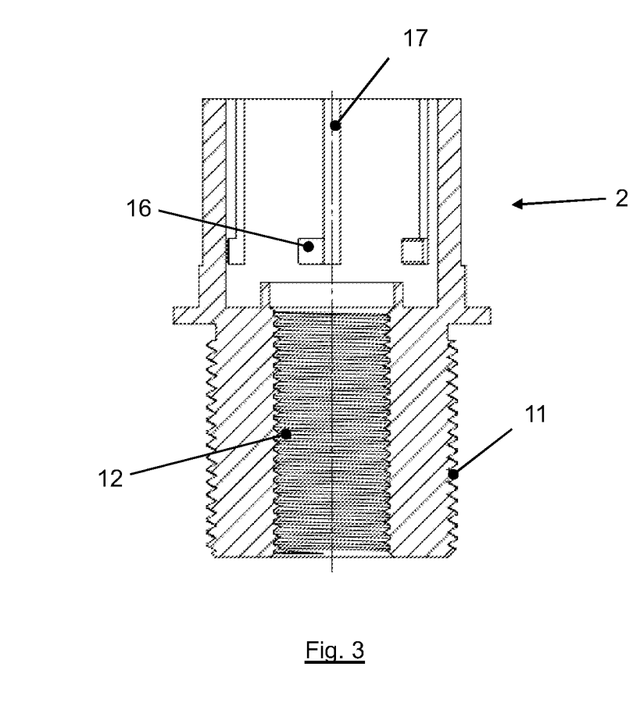
FIG. 3 illustrates a side view cross-sectional profile of an insert (2). The insert (2) is shown having an internal thread (12), an external thread (11), grooves (17), and snap-in groove (16).

FIG. 3 shows an insert (2) with an internal thread (12) and an external thread (11) and grooves (17). The grooves (17) fit to keys (18) of a female torque locking element (3) (see FIG. 4 for keys (18) of the female torque locking element (3)). The snap-in groove (16) of the insert (2) is used to hold the female torque locking element (3) so the locking mechanism is not activated. In certain embodiments, there is a minimum of one groove (17) and one snap-in groove (16) of the locking mechanism. The total number of grooves is generally dependent on the torque and can be adapted.

When the female torque locking element (3) is twisted or rotated, the key (18) releases from the snap-in groove (16), which thereby allows for the locking mechanism to be activated and the female torque locking element (3) to be pushed up to and engage the male torque locking element (4). The key (18) moves in the groove (17).

Additionally, the groove (17) and snap-in groove (16) can take other forms, such as a screw, a snap hook, tongue-and-groove, in essence, any configuration that fulfils the locking mechanism of the instant invention.

Figure 4:
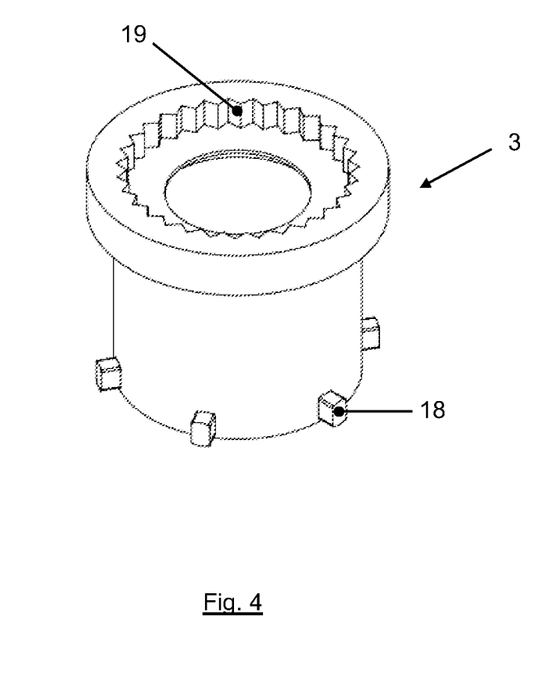
FIG. 4 illustrates a female torque locking element (3) with keys (18) and a female radial sprocket (19).
Figure 5:
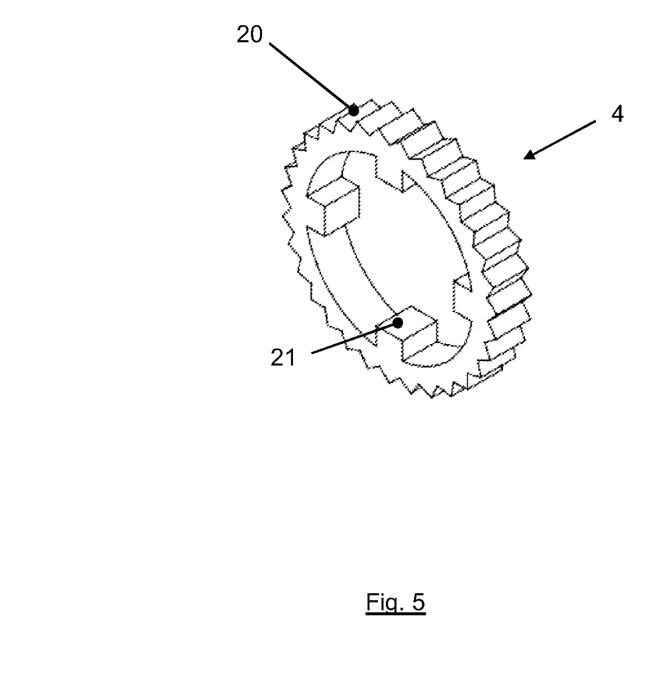
FIG. 5 illustrates a male torque locking element (4) with keys (21) and male radial sprocket (20).

FIG. 4 shows a female torque locking element (3) with keys (18) and a female radial sprocket (19). The female radial sprocket (19) serves the purpose of interlocking with a male sprocket (20) by a form-fitting connection when the female torque locking element (3) has been pushed up by a spring (15) (see also FIG. 5 illustrating a male sprocket (20)). The number of sprocket teeth is dependent on how precisely the length of the fork end (5) should be adjusted. For example, with more teeth, the adjustability is finer. The teeth of female torque locking element (3) and male torque locking element (4) fit into one another, and this is dependent on the position of the fork end (5). Any conceivable geometry that locks radially is feasible for the female torque locking element (3). The total number of keys (18) is dependent on the torque and can be adapted. For example, for withstanding a strong torque, there may be 6 keys (18) and for a light torque, there may be 1 key (18).

FIG. 5 shows a male torque locking element (4) with keys (21) and male radial sprocket (20). The male sprocket (20) fits to a female sprocket (19). Keys (21) fit to grooves (22) of a fork end (5). The keys (21) of the male torque locking element are used to transmit the torque that could act at the fork end (5) to a female torque locking element (3). Any conceivable geometry that fits to the geometry of the female torque locking element (3) is feasible for the male sprocket (20). Moreover, besides sprocket geometry any other geometry that leads to a form-fit connection is possible for the female torque locking element (3) and the male torque locking element (4).

Figure 6:
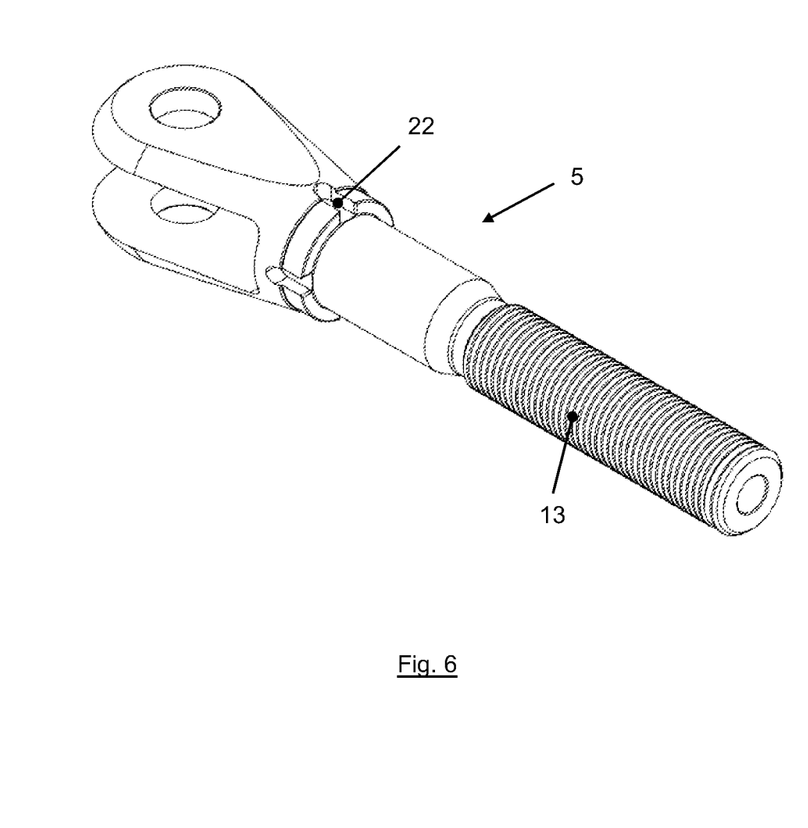
FIG. 6 illustrates a fork end (5) which is screwed into the insert (2) via external thread (13).

FIG. 6 shows a fork end (5) that is screwed in an insert (2) via an external thread (13). The fork end is used to transfer the tension and compression load into a tie rod as well as a torque to the female and male torque locking devices (3), (4) via the grooves (22).

Figure 7:
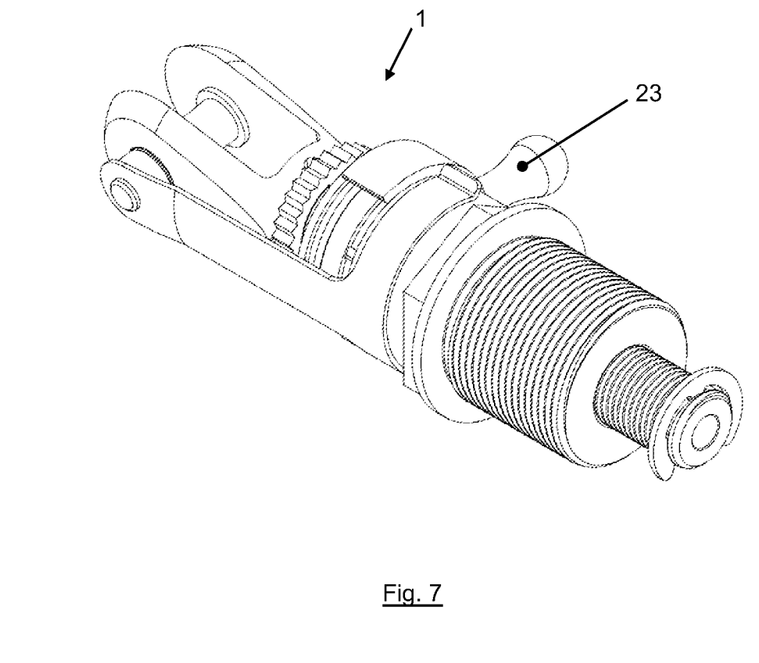
FIG. 7 illustrates a rod end (1) having a release clip (23).

FIG. 7 shows another embodiment of rod end (1). In FIG. 7, the locking mechanism of the female torque locking element (3) being pushed up by a spring (15) and engaging the male torque locking element (4) is activated by pulling a release clip (23). The release clip (23) can be made from any plastic material. The release clip (23) could also be made of other suitable materials as would be appreciated by a person of ordinary skill in the art such as, for example, metal.

Figure 8:
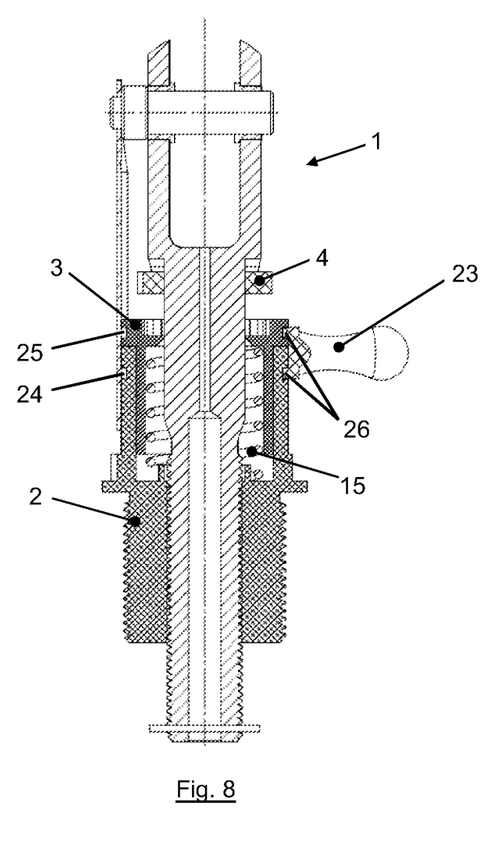
FIG. 8 illustrates a side view cross-sectional profile of a rod end (1) having a release clip (23).

FIG. 8 shows a side view cross section of a rod end (1) with a release clip (23). There is one groove (24) in insert (2) and one groove (25) in female torque locking element (3). Keys (26) of the release clip (23) fit to the grooves (24, 25).

As long as the release clip (23) is mounted on the rod end, the locking mechanism is not activated. By pulling the release clip (23), the keys (26) of the release clip disengage the groove of the insert (24) and the groove (25) of the female torque locking element, thereby activating the spring (15). The female torque locking element (3) is pushed upwards by the spring (15) and snaps into the male torque locking element (4) (as in, e.g., FIG. 2B)).

Figure 9:
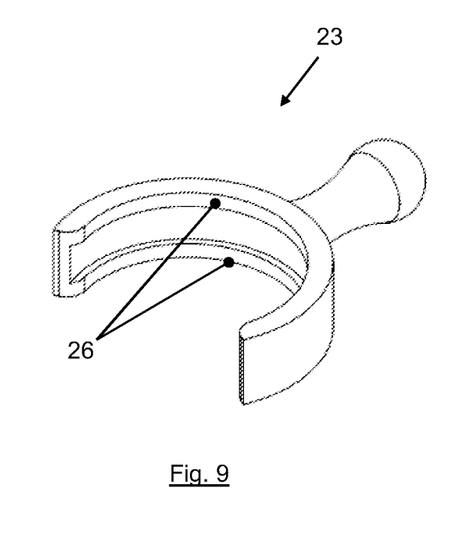
FIG. 9 illustrates a release clip (23) and keys (26) for the release clip (23).

FIG. 9 shows a release clip (23) and keys (26) of release clip (23). The clip is designed as an arc with a length greater than or equal to 180 degrees. However, any suitable shape for the clip that maintains the female torque locking element (3) in an inactive position may be used for the clip (23).

Figure 10:
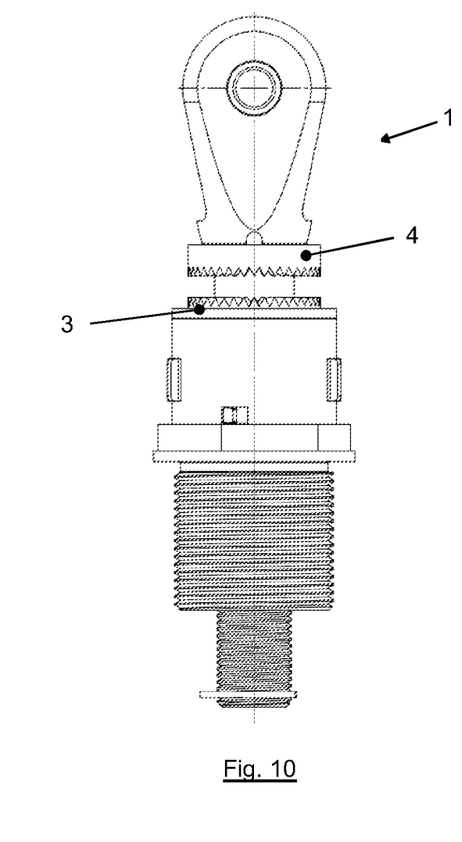
FIG. 10 illustrates a rod end (1) with female (3) and male (4) torque locking elements.

FIG. 10 shows a rod end (1) with another geometry of a female torque locking element (3) and a male torque locking element (4). In this embodiment, the locking mechanism in FIG. 10 works in an axial direction. In the embodiment depicted in FIG. 1, the locking mechanism works in a radial direction.

Figure 11:
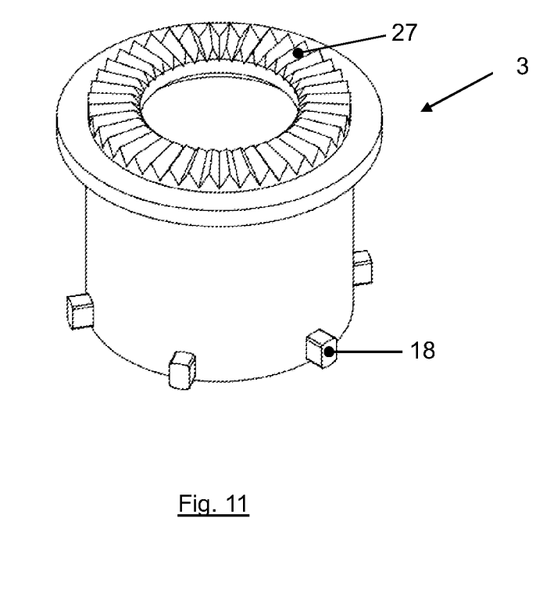
FIG. 11 illustrates a female torque locking element (3) with keys (18) and a female axial sprocket (27).

FIG. 11 shows a female torque locking element (3) with keys (18) and a female axial sprocket (27). The number of teeth of the sprocket is dependent on how precisely the length of a fork end (5) should be adjusted. Any conceivable geometry that locks axially is feasible for this element. The total number of keys (18) and size of the keys (18) is dependent on the torque and can be adapted. Generally, the more keys (18), the greater the torque that can be withstood. Also, generally, the greater the size of the keys (18), the greater the torque that can be withstood.

Figure 12:
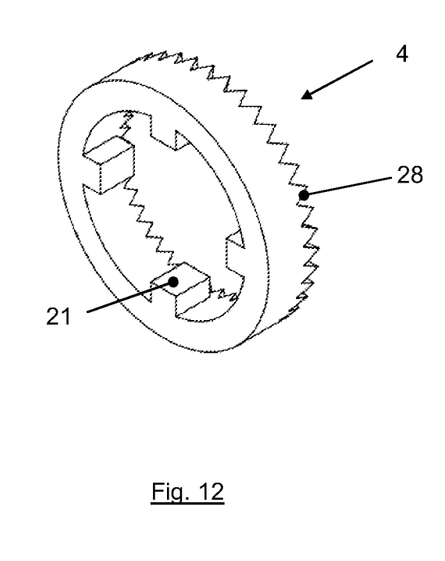
FIG. 12 illustrates a male torque locking element (4) with keys (21) and male axial sprocket (28).

FIG. 12 shows a male torque locking element (4) with keys (21) and male axial sprocket (28). The male sprocket (28) fits into a female sprocket (27). The keys (21) fit into grooves of a fork end (5). The keys (21) are used to transmit the torque that could act at the fork end (5) to the female torque locking element (3). Any conceivable geometry that fits to the geometry of the female torque locking element (3) is feasible for the sprocket (28). Beside sprocket geometry, any other geometry that leads to a form-fit connection is possible for the female torque locking element (3) and the male torque locking element (4), such as, e.g., a polygon.

LIST OF REFERENCE SIGNS (1) Rod end
(2) Insert
(3) Female torque locking element
(4) Male torque locking element
(5) Fork end
(6) Bushing
(7) Locking clip
(8) Latch
(9) Bolt
(10) Retaining washer
(11) External thread of the insert
(12) Internal thread of the insert
(13) External thread of the fork end
(14) Length adjustment
(15) Spring
(16) Snap-in groove for the female torque locking element
(17) Groove of the insert
(18) Key of the female torque locking element
(19) Female radial sprocket
(20) Male radial sprocket
(21) Key of the male torque locking element
(22) Groove for the keys of the male torque locking element
(23) Release clip (24) Groove for the release clip in the insert
(25) Groove for the release clip in the female torque locking element
(26) Keys of the release clip
(27) Female axial sprocket
(28) Male axial sprocket Modifications to the above disclosure would be obvious to those of ordinary skill in the art, but would not bring the invention so modified beyond the scope of the present invention. The claims to follow should be construed to cover such situations.

The invention claimed is:

1. A rod end comprising an integrated locking mechanism, wherein the locking mechanism is a part of the rod end and comprises an insert, a fork end, a female torque locking element, and a male torque locking element, wherein upon activation of the locking mechanism, the female torque locking element engages with the male torque locking element in a form-fitting connection, and wherein a length of the rod end is adjustable without application of additional torque when mounting the rod end.

2. The rod end of claim 1, wherein the female torque element is situated inside the insert.

3. The rod end of claim 1, wherein the insert comprises at least one groove and the female torque locking element comprises at least one key that fits into the insert groove.

4. The rod of claim 1, further comprising a spring.

5. The rod end of claim 4, wherein the female torque locking element is situated inside the insert at a position where the female torque locking element is not engaged with the male torque locking element, and wherein the spring is situated below the female torque locking element such that upon adjusting the female torque locking element into a free position, the female torque locking element is moved by the spring such that the female torque locking element engages the male torque locking element in the form-fitting connection.

6. The rod end of claim 1, wherein the female torque locking element further comprises a female radial sprocket.

7. The rod end of claim 1, wherein upon activation of the locking mechanism, a male sprocket engages a female sprocket in the form-fitting connection between the female torque locking element and the male torque locking element.

8. The rod end of claim 1, further comprising a locking clip and a latch.

9. The rod end of claim 1, further comprising a release clip comprising one or more keys.

10. The rod end of claim 9, wherein the release clip comprises plastic.

11. The rod end of claim 1, wherein activation of the locking mechanism is external to the rod end.

12. The rod end of claim 1, further comprising a radial sprocket.

13. The rod end of claim 1, further comprising an axial sprocket.

14. A rod end comprising an integrated locking mechanism, wherein the locking mechanism is a part of the rod end and comprises an insert, a fork end, a female torque locking element, a male torque locking element, and a spring,
wherein upon activation of the locking mechanism, the female torque locking element engages with the male torque locking element in a form-fitting connection,
wherein the female torque locking element is situated inside the insert at a position where the female torque locking element is not engaged with the male torque locking element, and
wherein the spring is situated below the female torque locking element such that upon adjusting the female torque locking element into a free position, the female torque locking element is moved by the spring such that the female torque locking element engages the male torque locking element in the form-fitting connection, and
wherein the insert has a snap-in groove that holds the female torque locking element at a position where the female torque locking element is not engaged with the male torque locking element until the locking mechanism is activated.

15. A rod end comprising an integrated locking mechanism, wherein the locking mechanism is a part of the rod end and comprises an insert, a fork end, a female torque locking element, and a male torque locking element, wherein upon activation of the locking mechanism, the female torque locking element engages with the male torque locking element in a form-fitting connection, and wherein the male torque locking element further comprises one or more keys and a male radial sprocket.

16. A rod end comprising an integrated locking mechanism, wherein the locking mechanism is a part of the rod end and comprises an insert, a fork end, a female torque locking element, a male torque locking element, and a spring,
wherein upon activation of the locking mechanism, the female torque locking element engages with the male torque locking element in a form-fitting connection,
wherein the female torque locking element is situated inside the insert at a position where the female torque locking element is not engaged with the male torque locking element, and
wherein the spring is situated below the female torque locking element such that upon adjusting the female torque locking element into a free position, the female torque locking element is moved by the spring such that the female torque locking element engages the male torque locking element in the form-fitting connection, and wherein the insert comprises a groove and the female torque locking element comprises a groove and wherein one or more keys of a release clip fit into the grooves such that the locking mechanism is inactive.

17. The rod end of claim 16, wherein the locking mechanism is activated by pulling the release clip, whereby the female torque locking element is adjusted into a free position such that it is pushed upward by the spring such that the female torque locking element engages the male torque locking element in the form-fitting connection.

* * * * *